Sept. 29, 1959　　　M. H. PARKS　　　2,906,504
LUBRICATION OF BEARINGS
Filed Aug. 7, 1958
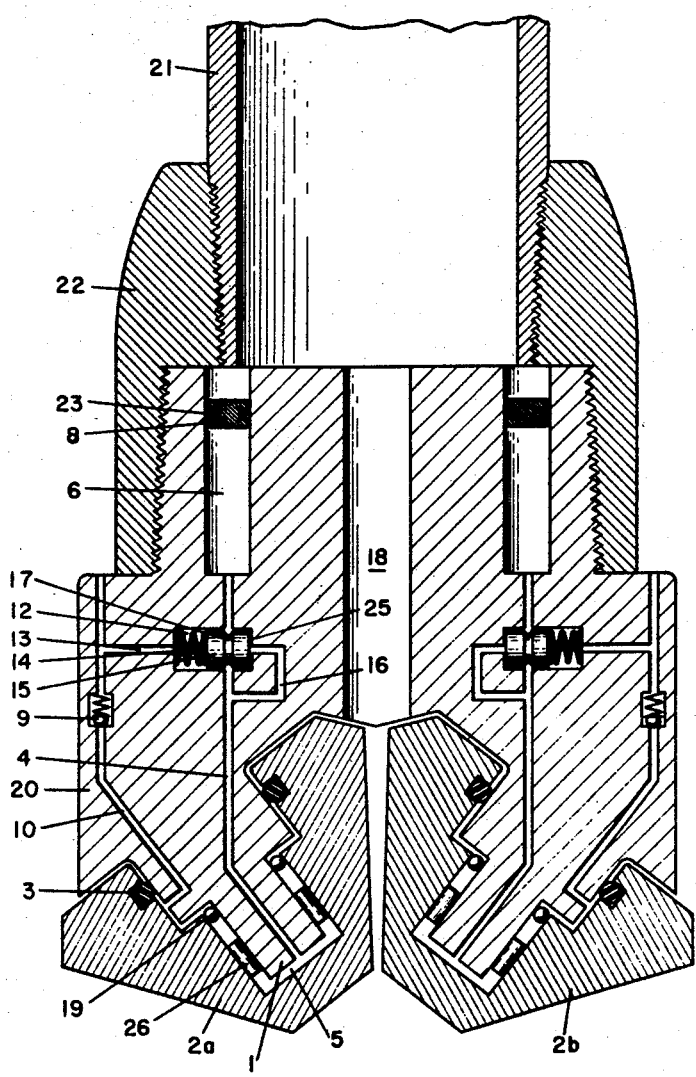
INVENTOR.
MERCER H. PARKS,
BY John B. Davidson
ATTORNEY.

United States Patent Office 2,906,504
Patented Sept. 29, 1959

2,906,504

LUBRICATION OF BEARINGS

Mercer H. Parks, Houston, Tex., assignor, by mesne assignments, to Jersey Production Research Company, Tulsa, Okla., a corporation of Delaware Application August 7, 1958, Serial No. 753,800

6 Claims. (Cl. 255—305)

This invention relates generally to the lubrication of bearings, and more particularly to bearing lubrication of equipment designed to operate in abrasive fluids at a remote location where it is inconvenient or impossible to replenish the lubricant initially provided with the equipment. In a more specific aspect, the invention relates to the lubrication of the bearings of a drill bit.

There are many types of devices that must operate in an abrasive fluid medium at a remote location. A specific example of such a device is a rock bit utilizing conical cutting members. It is desirable that rock bits operate as long as possible when drilling a borehole in the earth without having to retract the drill stem from the earth for the purpose of bit replacement.

It has been found that in some earth formations bearing failure occurs in a rock bit before the teeth of the bit wear away. Bearing failure has been found to be caused most often by inadequate or improper lubrication. It has been the practice either to operate the bit without lubrication other than the drilling fluid within which the bit functions, or to seal the bearings with a petroleum base or synthetic lubricant, and to depend upon the drilling fluid to supply lubrication if the lubricant is forced out of the bearings. The weight placed on a bit is an important factor that determines the drilling rate obtainable with the bit. Inasmuch as the maximum weight that can be placed on a bit is limited by the weight at which lubrication failure occurs, manifestly it is desirable to provide proper, adequate lubrication for the bearings of a rock bit. Typical apparatus that have been used in the past in efforts to achieve this end are described in U.S. Patent No. 1,487,319, Duda; Patent No. 1,238,757, Gardner, and Patent No. 2,814,465, Green.

In accordance with the teachings of the present invention there is provided apparatus for lubricating bearing surfaces between a body member and a revoluble member. A pressurizable lubricant storage chamber associated with the body member is interconnected with the bearing surfaces through a first passageway. A second passageway interconnects the opposite end of the bearing surfaces and the exterior of the body member. The bearing surfaces are sealed from the exteriors of the body member and the revoluble member by means including a relief valve means in the second named passageway and the usual bearing closures. The relief valve means is adapted to be opened by a differential pressure thereacross of a first predetermined magnitude. Thus, the lubricant within the bearing may be maintained at a positive pressure relative to the pressure to the body member to prevent entry into the bearing of abrasive fluids without the danger of rupturing the bearing closures. In the first passageway there is provided valve means which is adapted to close the passageway responsive to differential pressure of a second predetermined magnitude in the passageway, the second predetermined magnitude being less than the first predetermined magnitude. The relief valve is operative to allow the lubricating pressure to be relieved when the differential pressure thereacross becomes excessively high. The valve means in the first passageway is operative to regulate lubricant pressure in the bearings and to cut off pressure from the bearing in order to prevent fluid from issuing in a steady stream from the relief valve when lubricant pressure in the bearing becomes excessively high.

The invention will be described in detail with reference to the accompanying drawing, wherein the single figure depicts an embodiment of the invention adapted for use with rock bits.

In the single figure of the drawing there is shown a pair of rock bit cutters 2a and 2b and associated bearings, support trunnions, and lubricating systems. For the sake of clarity and to avoid cluttering the drawing with a profusion of reference numerals, the invention will be described with specific reference to the bit and apparatus at the left of the drawing.

Rock bit cutter 2a is revolubly supported on trunnion 1 in the usual manner by means of a roller bearing 26 and a thrust-type ball bearing 19. Trunnion 1 is integral with body member 20; the body member 20 also includes the trunnion for the other bearing or bearings. Body member 20 is coupled to drill stem 21 by means of a drill-bit sub 22.

A lubricant storage chamber 6 is included in the upper end of drill-bit body member 20. The storage chamber 6 may be cylindrical, cubical, or other convenient configuration, and is adapted to receive a free piston 8. A fluid seal between the piston 8 and the sides of the chamber 6 may be had by means of an O-ring 23. The piston is subject to pressure in the interior of drill stem 21 so that mud pressure within the drill stem bears against the upper surface of piston 8 to exert fluid pressure on lubricant within the lower portion of chamber 6. A conventional nozzle or orifice 18 is provided for circulation of fluids from drill stem 21 in the normal manner.

For the purpose of preventing entry into the bearings of the fluids in which the rotating bit cutter 2a must operate and for holding lubricant in the bearings, there is provided a bearing closure or seal 3.

A passageway 4 is provided for interconnecting pressurized chamber 6 and the space 5 between the lower end of trunnion 1 and bit cutter 2a. A second passageway 10 interconnects the opposite end of the bearing with the exterior of the body member 20. Passageways 4 and 10 should terminate at opposite ends of the bearing so that lubricant will be spread throughout the bearing surfaces. For the purpose of preventing failure of bearing closure 3 due to excessively high lubrication pressure in the bearing chamber, a relief valve 9 is inserted in passageway 10. The relief valve 9 may be of any conventional type that is adapted to open when the differential thereacross is greater than a predetermined amount.

For the purpose of regulating lubricant pressure around the bearing and to prevent a steady stream of lubricant from issuing from passageway 10 when valve 9 is open, a pressure control valve is provided in passageway 4. The pressure control valve may include a chamber 12 that intersects passageway 4, and a spring biased piston 15. The piston 15 may have an annular groove 17 in its surface or a passageway drilled therethrough for the purpose of interconnecting the upper and lower sections of passageway 4. The biasing spring 14 should normally bias piston 15 to a position whereat annular groove 17 provides fluid communication through passageway 4. The left end of chamber 12, as viewed, is connected to the exterior of body member 20 through passageway 13 and the upper portion of passageway 10. Passageway 16 interconnects the right end of chamber 12, as viewed, with the lower portion of passageway 4. Thus, face 25 is exposed to the fluid pressure within drill stem 21, and the left end of piston 15 is exposed to the fluid pressure outside of the drill stem, so that the pressure drop across passageway 18 is exerted across the piston. Thus, piston 15 will move to the left when the force exerted on the piston produced by differential pressure between the interior and exterior of drill stem 21 exceeds the force exerted on the piston by spring 14.

The operation of the apparatus described above is as follows: Let it be assumed that the drill-bit has been lowered to the bottom of the borehole and that mud pressure has been applied to the interior of drill stem 21 so that the lubricant within chamber 6 is under pressure. Let it be further assumed that the bearing has been packed with lubricant so as to fill passageways 4 and 10 and the bearing space 5. The pressure exerted on piston 23 will pressurize the lubricant within the system so that the abrasive fluid around the bit cannot force its way into the bearings.

When the lubricant pressure increases to the point that the differential pressure across piston 15 overcomes the force exerted on piston 15 by spring 14, piston 15 will move to the left to cut off chamber 6 from the bearings. As the bit rotates, the temperature rise in the bearings may cause the lubricant pressure in the bearings to build up so that relief valve 9 will open momentarily. When the pressure in line 4 is reduced because of loss of lubricant, the piston will move to the right momentarily to allow lubricant pressure to build up again around the bearings. Piston 15 again will move to the left against the pressure of spring 14 and will cut off lubricant storage chamber 6 from the bearing system until the lubricant pressure in the bearing system again falls below the pressure required to actuate the control valve.

To prevent lubricant from flowing through valve 9 in an uncontrolled stream, the differential pressure required for actuating relief valve 9 should be greater than the differential pressure required for actuating the control valve piston 15.

While the invention has been described with specific reference to a cone rock bit, manifestly it may be adapted to other apparatus. For example, the invention may be utilized for lubricating the bearings of a turbine driven bit. Thus, the invention is not to be restricted to the specific structural details or arrangement of parts herein set forth, as various modifications thereof may be effected without departing from the spirit and scope of this invention.

What is claimed is:

1. In combination: a drill stem; at least one roller type earth boring bit cutter; a body member coupled to the lower end of said drill stem adapted to restrict flow of drilling fluids from said drill stem so that a differential pressure will exist between the interior and exterior of said drill stem, said body member having at least one trunnion for supporting said at least one bit cutter; roller type bearing members between said bit cutter and said trunnion; a lubricant storage chamber within said body member; free piston means in said storage chamber adapted to exert fluid pressure from the interior of said drill stem on lubricant in said storage chamber; a first passageway within said body member for conducting lubricant to said bearing members from said chamber; a second passageway within said body member for conducting lubricant from said bearing members to the exterior of said body member; means, including a relief valve within said second passageway, adapted to seal said bearing members from the exterior of said body member and the exterior of said bit cutter; said relief valve being adapted to open said second passageway when the pressure of lubricant between said bit cutter and said trunnion exceeds the pressure of fluids outside said bit cutter by a predetermined magnitude; a second chamber within said body member in fluid communication with the exterior of said drill stem and intersecting said first passageway so that fluid passing through said first passageway must flow through said second chamber; a second piston in said second chamber; a channel in said piston, a spring engaging one face of said second piston to bias said second piston to a normal position in said chamber whereat said channel provides flow of fluid through said first passageway, fluid flow through said first passageway being cut off by said second piston at other positions of said piston; a third passageway interconnecting the portion of said first passageway between said second chamber and said bearing with the portion of the second chamber containing the face of said second piston opposite to the face engaged by said spring to move said second piston away from the normal position thereof responsive to differential pressure of greater than a predetermined magnitude between the interior and exterior of said drill stem.

2. In combination: a drill stem; at least one roller type earth boring bit cutter; a body member connected to the lower end of said drill stem, adapted to restrict flow of fluids from said drill stem to produce a differential pressure between the interior and exterior of said drill stem; said body member having at least one trunnion for supporting said at least one bit cutter; roller bearing members between said at least one bit cutter and said at least one trunnion; a lubricant storage chamber within said body member; means operatively associated with said chamber for subjecting lubricant in said chamber to pressure within said drill stem; a first passageway between said storage chamber and one end of said bearing members; a second passageway between the other end of said bearing members and the exterior of said body member; relief valve means normally closing said second passageway to prevent egress of lubricant from the space between said at least one trunnion and said at least one bit cutter, said relief valve means being adapted to open said second passageway responsive to a differential pressure thereacross of predetermined magnitude; and normally open valve means in said first passageway adapted to close said first passageway responsive to a second differential pressure of predetermined magnitude between the interior and exterior of said drill stem; the pressure opening said relief valve means being greater than the pressure closing said normally open valve means.

3. Apparatus for lubricating bearing means between a fixed body member and a revoluble member comprising: a lubricant storage chamber within the body member; means for pressurizing the lubricant within said lubricant storage chamber; a first passageway interconnecting said storage chamber and one end of the bearing means; a second passageway interconnecting the other end of said bearing means and the exterior of the body member; means sealing said bearing means from the exterior of the body member including relief valve means in said second passageway; said relief valve means being adapted to open said second passageway responsive to a fluid pressure in the bearing means greater than the pressure external to the body member by a first predetermined magnitude; and valve means in said first passageway adapted to close said passageway responsive to a pressure of a second predetermined magnitude, said second predetermined magnitude being less than said first predetermined magnitude.

4. Apparatus for lubricating bearing means between a fixed body member and a revoluble member comprising: a lubricant storage chamber within said body member; means for pressurizing the lubricant in said storage chamber; means sealing said bearing means from the exterior of said body member and said revoluble member; a first passageway interconnecting said storage chamber and said bearing means; a second passageway interconnecting said bearing means and the exterior of said body member; said first and second passageways being connected to opposite ends of said bearing means; a normally closed relief valve in said second passageway adapted to open said second passageway when differential pressure of a first given magnitude appears thereacross as a result of increase of lubricant pressure between said fixed body member and said revoluble member; and a normally open valve in said first passageway adapted to close responsive to pressure of a second given magnitude in said first passageway less than said pressure of said first given magnitude.

5. Apparatus for lubricating bearing means between a fixed body member and a revoluble member comprising: first means within said body member for storing lubricant under pressure; means for sealing said bearing means from the exterior of said body member and said revoluble member; a first passageway interconnecting said first means and said bearing means; a second passageway interconnecting said bearing means and the exterior of said body member; said first and second passageways being connected to opposite ends of said bearing means; a normally closed relief valve in said second passageway adapted to open said second passageway when lubricant pressure between said fixed body member and said revoluble member exceeds the pressure external to said body member by a first given magnitude; and a normally open valve in said first passageway adapted to close responsive to pressure of a second given magnitude in said first passageway less than the pressure of said first given magnitude.

6. Apparatus for lubricating bearing means between a fixed body member and a revoluble member comprising: a lubricant storage chamber within said body member; means for pressurizing the lubricant in said storage chamber; means interconnecting said storage chamber and said bearing means including first normally open valve means adapted to close said interconnecting means when lubricant pressure in said bearing means is greater than a first given pressure; means sealing lubricant between said fixed body member and said revoluble member including relief valve means adapted to vent lubricant when lubricant pressure between said revoluble member and said body member is greater than a second given pressure, said first given pressure being less than said second given pressure.

References Cited in the file of this patent
UNITED STATES PATENTS

| | | |
|---|---|---|
| 1,238,757 | Gardner | Sept. 4, 1917 |
| 1,487,319 | Duda | Mar. 18, 1924 |
| 1,576,370 | Scott | Mar. 9, 1926 |
| 1,708,288 | Wadsworth | Apr. 9, 1929 |
| 2,072,180 | Paton | Mar. 2, 1937 |
| 2,692,803 | Gerard | Oct. 26, 1954 |
| 2,814,465 | Green | Nov. 26, 1957 |